(12) United States Patent
Singla et al.

(10) Patent No.: US 9,824,107 B2
(45) Date of Patent: Nov. 21, 2017

(54) TRACKING CHANGING STATE DATA TO ASSIST IN COMPUTER NETWORK SECURITY

(75) Inventors: Anurag Singla, Mountain View, CA (US); Kumar Saurabh, Daly City, CA (US); Kenny C. Tidwell, Los Altos, CA (US)

(73) Assignee: EntIT Software LLC, Sunnyvale, CA (US)

( * ) Notice: Subject to any disclaimer, the term of this patent is extended or adjusted under 35 U.S.C. 154(b) by 914 days.

(21) Appl. No.: 11/923,502

(22) Filed: Oct. 24, 2007

(65) Prior Publication Data
US 2008/0104046 A1 May 1, 2008

Related U.S. Application Data

(60) Provisional application No. 60/862,932, filed on Oct. 25, 2006.

(51) Int. Cl.
*G06F 17/00* (2006.01)
*G06F 17/30* (2006.01)
(Continued)

(52) U.S. Cl.
CPC .. *G06F 17/30333* (2013.01); *G06F 17/30492* (2013.01); *G06F 17/30551* (2013.01);
(Continued)

(58) Field of Classification Search
USPC .......................... 707/600–700, 648; 709/224
See application file for complete search history.

(56) References Cited

U.S. PATENT DOCUMENTS

| 5,907,621 A | 9/1999 | Bachman et al. |
| 6,973,494 B2 | 12/2005 | Weisser, Jr. et al. |

(Continued)

FOREIGN PATENT DOCUMENTS

| JP | 2005005854 A | 1/2005 |
| JP | 2005020222 A | 1/2005 |

(Continued)

OTHER PUBLICATIONS

T.K. Apostolopoulos et al., *Enforcing security policies in large scale communication networks*, Proceedings: 17th IEEE Symposium on Reliable Distributed Systems, Oct. 20-23, 1998, pp. 393-397. [Abstract only].

(Continued)

*Primary Examiner* — Hosain Alam
*Assistant Examiner* — Tuan-Khanh Phan

(57) ABSTRACT

A session table includes one or more records, where each record represents a session. Session record information is stored in various fields, such as key fields, value fields, and timestamp fields. Session information is described as keys and values in order to support query/lookup operations. A session table is associated with a filter, which describes a set of keys that can be used for records in that table. A session table is populated using data contained in security information/events. Rules are created to identify events related to session information, extract the session information, and use the session information to modify a session table. A session table is partitioned so that the number of records in each session table partition is decreased. A session table is processed periodically so that active sessions are moved to the current partition.

15 Claims, 1 Drawing Sheet

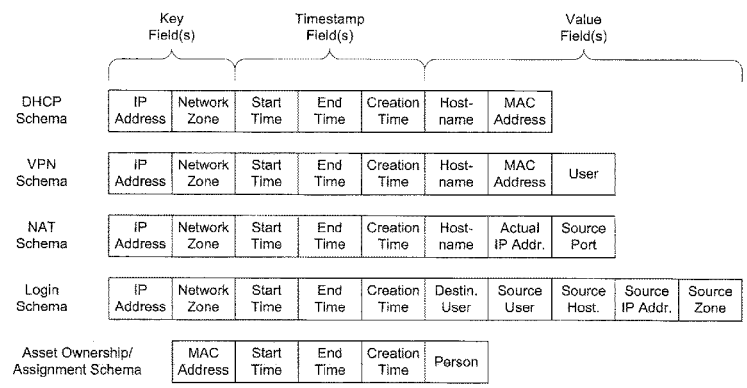

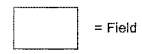

(51) Int. Cl.
  *H04L 29/12* (2006.01)
  *H04L 29/06* (2006.01)
  *H04L 29/08* (2006.01)

(52) U.S. Cl.
  CPC ........ *H04L 29/12783* (2013.01); *H04L 61/35* (2013.01); *H04L 63/1408* (2013.01); *H04L 63/20* (2013.01); *H04L 67/142* (2013.01)

(56) References Cited

U.S. PATENT DOCUMENTS

| | | |
|---|---|---|
| 7,111,162 B1 | 9/2006 | Bagepalli et al. |
| 7,117,504 B2 | 10/2006 | Smith et al. |
| 7,185,366 B2 | 2/2007 | Mukai et al. |
| 7,203,682 B2 | 4/2007 | Balogh |
| 7,219,239 B1 | 5/2007 | Njemanze et al. |
| 7,260,844 B1 | 8/2007 | Tidwell et al. |
| 7,333,999 B1 | 2/2008 | Njemanze |
| 7,376,969 B1 | 5/2008 | Njemanze |
| 7,565,696 B1 | 7/2009 | Njemanze |
| 7,607,169 B1 | 10/2009 | Njemanze |
| 7,644,438 B1 | 1/2010 | Dash |
| 7,647,632 B1 | 1/2010 | Ward |
| 7,650,638 B1 | 1/2010 | Njemanze |
| 7,788,722 B1 | 8/2010 | Njemanze |
| 7,809,131 B1 | 10/2010 | Njemanze |
| 7,844,999 B1 | 11/2010 | Aguilar-Macias |
| 7,861,299 B1 | 12/2010 | Tidwell |
| 7,899,901 B1 | 3/2011 | Njemanze |
| 8,015,604 B1 | 9/2011 | Tidwell |
| 8,108,550 B2 | 1/2012 | Lahoti |
| 8,176,527 B1 | 5/2012 | Njemanze |
| 8,528,077 B1 | 9/2013 | Tidwell |
| 8,613,083 B1 | 12/2013 | Njemanze |
| 9,027,120 B1 | 5/2015 | Tidwell |
| 9,031,916 B2 | 5/2015 | Huang |
| 9,100,422 B1 | 8/2015 | Tidwell |
| 2002/0065912 A1* | 5/2002 | Catchpole et al. ........... 709/224 |
| 2003/0084057 A1 | 5/2003 | Balogh et al. |
| 2003/0167355 A1 | 9/2003 | Smith et al. |
| 2005/0060562 A1 | 3/2005 | Bhattacharya et al. |
| 2005/0182773 A1 | 8/2005 | Feinsmith |
| 2005/0215421 A1 | 9/2005 | Barry et al. |
| 2005/0216421 A1 | 9/2005 | Barry et al. |
| 2005/0251860 A1 | 11/2005 | Saurabh et al. |
| 2006/0070128 A1 | 3/2006 | Heimerdinger et al. |
| 2006/0112178 A1 | 5/2006 | Van Vleet et al. |
| 2006/0212932 A1 | 9/2006 | Patrick et al. |
| 2007/0043703 A1* | 2/2007 | Bhattacharya .... G06F 17/30386 |
| 2007/0260931 A1 | 11/2007 | Aguilar-Macias et al. |
| 2008/0046994 A1* | 2/2008 | Venkatraman ...... H04L 63/0272 726/15 |

FOREIGN PATENT DOCUMENTS

| | | | |
|---|---|---|---|
| JP | 2005244603 | A | 9/2005 |
| TW | 200530826 | A | 9/2005 |
| TW | 200605577 | A | 2/2006 |
| TW | 200635295 | A | 10/2006 |

OTHER PUBLICATIONS

T.K. Apostolopoulos et al., *The role of the time parameter in a network security management model*, Proceedings: Second IEEE Symposium on Computers and Communications, Jul. 1-3, 1997, pp. 528-532. [Abstract only].

T.K. Apostolopoulos et al., *SNMP—based network security management using a temporal database approach*, Information Systems Security: facing the information society of the 21st century, 1996, pp. 417-427, London, UK. [Citation only].

T.K. Apostolopoulos et al., *Temporal Network Management Model Concepts and Implementation Issues*, Computer Communications, Aug. 25, 1997, pp. 694-708, vol. 20, Issue No. 8. [Abstract only].

Benjamin Fabian, *Physical Intrusion Detection Using RFID: Trends, Technology, Problems* (Presentation Slides), First German Informatics Society (GI) Special Interest Group (SIG) Intrusion Detection and Response (SIDAR) Graduate Workshop on Reactive Security (SPRING), Institute of Information Systems, HU Berlin, Jul. 2006, pp. 1-15 [online], Retrieved on Mar. 17, 2008, Retrieved from the URL: <https://eldorado.uni-dortmund.de/bitstream/2003/22613/1/Spring-1_Benjamin_Fabian.pdf>.

Hans-Peter Kriegel et al., *Managing Intervals Efficiently in Object-Relational Databases*, Proceedings of the 26th International Conference on Very Large Databases, Cairo, Egypt, 2000, pp. 407-418.

Frederic Massicotte et al., *Context-Based Intrusion Detection Using Snort, Nessus and Bugtraq Databases*, 3rd Annual Conference on Privacy, Security and Trust , Oct. 12-14, 2005.

Dennis McCallam et al., *Real Time Intrusion Detection—Applying Correlation and Fusion for Outside the Network Attack Forecasting and Insider Attack Detection*, RTO-MP-101, AC/323(IST-033)TP/18, NATO Research and Technology Organization (RTO) Information Systems Technology Panel (IST) Symposium on Real Time Intrusion Detection, May 27-28, 2002, pp. 6-1-6-13.

Jason A. Minto, *Open Source Security Information Management (OSSIM) User Guide: Monitors*, Oct. 30, 2007, [online], retrieved from the internet on Apr. 4, 2008, retrieved from the URL: <http://www.ossim.net/dokuwiki/doku.php?id=user_manual:monitors>.

Peter G. Neumann, *The Challenges of Insider Misuse*, Aug. 23, 1999, Workshop on Preventing, Detecting and Responding to Malicious Insider Misuse, Aug. 16-18, 1999, pp. 1-18, Santa Monica, CA, USA.

Tetsuji Takada et al., *Tudumi: Log Information Visualization System for Intrusion Detection*, UEC-IS-TR-2000-08, Sep. 2000, pp. 1-10.

*Cisco Adaptive Threat Defense for Education Networks*, 2005, pp. 1-10, [online], Retrieved on Mar. 17, 2008, retrieved from the URL: <http://www.cisco.com/web/strategy/docs/higher_CampusSecure_defense_WP.pdf>.

*Security Threat Mitigation (STM): The Protego Networks Mitigation and Response System (MARS)*, 2003, [online], Retrieved on Mar. 17, 2008, pp. 1-7, retrieved from the URL: <http://www.ihavebeenhacked.com/whitepapers/cisco_MARS.pdf>.

*Optimizing Security and Network Operations—Stealthwatch Identity—1000*, 2006, [online], Retrieved on Mar. 17, 2008, pp. 1-2, retrieved from the URL: <http://www.spectrum-systems.com/vendors/lancope/StealthWatch_ID-1000.pdf>.

*Know Automatically who is responsible and who is affected—with stealthwatch Identity—1000*, 2008, [online], Retrieved on Mar. 17, 2008, pp. 1-2, retrieved from the URL: <www.lancope.com/products/stealthwatch-id/index.aspx>.

*Securify 5.3 Solution Overview*, 2007, pp. 1-4, [online], Retrieved on Mar. 17, 2008, retrieved from the URL: <http://www.securify.com/pdfs/Securify_53_datasheet.pdf>.

*How to Monitor the DHCP Log file*, Oct. 27, 2006, pp. 1-2, [online], Retrieved on Mar. 17, 2008, retrieved from the URL: <http://support.microsoft.com/kb/298367>.

*Moving from concepts to real solutions: Vulnerability Analysis and Best Practices for Adopting IP Communications*, [online], Retrieved on Mar. 17, 2008, 2006, pp. 1, 5 & 6 of 21, retrieved from the URL: <http://www.cio.co.uk/whitepapers/index.cfm?whitepaperid=4324>.

*Secure Associates introduces the new multi-tier architecture that creates a whole centralized monitoring environment*, Jan. 8, 2006, pp. 1-3, [online] Retrieved on Mar. 17, 2008, retrieved from the URL: <http://web.archive.org/web/20070811014104/http://securesa.com/co_news_010806.htm>.

*Network Intelligence Releases Next-Generation Standard for Compliance and Security with envision v3*, Oct. 11, 2005, pp. 1-3, [online], Retrieved on Mar. 17, 2008, retrieved from the URL: <http://www.rsa.com/press_release.aspx?id=7584>.

U.S. Appl. No. 10/308,415, filed Dec. 2, 2002, [copy not enclosed].
U.S. Appl. No. 10/308,767, filed Dec. 2, 2002, [copy not enclosed].
U.S. Appl. No. 10/308,548, filed Dec. 2, 2002, [copy not enclosed].
U.S. Appl. No. 10/308,941, filed Dec. 2, 2002, [copy not enclosed].
U.S. Appl. No. 10/308,416, filed Dec. 2, 2002, [copy not enclosed].
U.S. Appl. No. 10/308,418, filed Dec. 2, 2002, [copy not enclosed].
U.S. Appl. No. 10/308,417, filed Dec. 2, 2002, [copy not enclosed].

(56) References Cited

OTHER PUBLICATIONS

U.S. Appl. No. 10/308,584, filed Dec. 2, 2002, [copy not enclosed].
U.S. Appl. No. 10/733,073, filed Dec. 10, 2003, [copy not enclosed].
U.S. Appl. No. 10/713,471, filed Nov. 14, 2003, [copy not enclosed].
U.S. Appl. No. 10/683,221, filed Oct. 10, 2003, [copy not enclosed].
U.S. Appl. No. 10/683,191, filed Oct. 10, 2003, [copy not enclosed].
U.S. Appl. No. 10/821,459, filed Apr. 9, 2004, [copy not enclosed].
U.S. Appl. No. 10/839,563, filed May 4, 2004, [copy not enclosed].
U.S. Appl. No. 10/976,075, filed Oct. 27, 2004, [copy not enclosed].
U.S. Appl. No. 10/975,962, filed Oct. 27, 2004, [copy not enclosed].
U.S. Appl. No. 10/974,105, filed Oct. 27, 2004, [copy not enclosed].
U.S. Appl. No. 11/029,920, filed Jan. 4, 2005, [copy not enclosed].
U.S. Appl. No. 11/021,601, filed Dec. 23, 2004, [copy not enclosed].
U.S. Appl. No. 11/070,024, filed Mar. 1, 2005, [copy not enclosed].
U.S. Appl. No. 11/740,203, filed Apr. 25, 2007, [copy not enclosed].
U.S. Appl. No. 11/836,251, filed Aug. 9, 2007, [copy not enclosed].
U.S. Appl. No. 11/966,078, filed Dec. 28, 2007, [copy not enclosed].
U.S. Appl. No. 11/923,513, filed Dec. 24, 2007, [copy not enclosed].
U.S. Appl. No. 11/023,942, filed Dec. 24, 2004, pp. 1-26.
PCT International Search Report and Written Opinion, PCT/US 07/82560, Jun. 12, 2008, 8 pages.
Intellectual Property Office of Singapore Written Opinion and Search Report, Singapore Patent Application No. 200901117-2, Dec. 21, 2010, fifteen pages.
Dorot, V. et al. "Explanatory Dictionary of Modern Computer Lexis," 2004, 3$^{rd}$ Ed., BHV-Petersburg, publishers, St. Petersburg, Russia, pp. 130, 239, 394, 444 (with partial English translation).
Kuznetsov, S.A., "Large Explanatory Dictionary of Russian Language," 2000, p. 1453, Norint publishers, St. Petersburg, Russia (with partial English translation).
Microsoft Press, "Explanatory Dictionary for Computer Techniques," 1996, p. 318, Russian Edition (with partial English translation).
New Zealand Intellectual Property Office Examination Report, New Zealand Patent Application No. 574567, Oct. 27, 2010, one page.
Polovinkin, A. et al., "Technical Art: Theory, Methodology, Practice," *Inform System*, 1995, p. 201, Moscow, Russia (with partial English translation).
Russian Federation Patent Office Official Action, Russian Patent Application No. 2009107162, Feb. 2, 2010, ten pages.
Russian Federation Patent Office Official Action, Russian Patent Application No. 2009107162, Aug. 3, 2010, ten pages.
TW Office Action Mailed Jun. 24 2013 for Serial No. 96140097 filed Oct. 25, 2007.
Australia Office Action dated Jun. 24, 2011 for serial No. 2007308828 filed Oct. 25, 2007 (3 pages).
Canada Office Action dated Nov. 19, 2011 for serial No. 2,660,847 filed Oct. 25, 2007 (3 pages).
European Patent Office, Extended European Search Report for Appl. No. 07868579.9 dated Jun. 4, 2014 (7 pages).
New Zealand Intellectual Property Office, Examination Report for Appl. No. 574567 dated Jan. 12, 2012 (3 pages).
Office Action received in Canadian Application No. 2,660,847, dated Dec. 4, 2012 (4 pages).
Singapore Search Report dated Dec. 21, 2010 for serial No. 2009011172 filed Oct. 25, 2007 (15 pages).
English translation of the Japanese Office Action for Appl. No. 2009-534869 dated Jun. 5, 2012 (8 pages).
Watanabe, Hidetoshi; Part 2, How does one collect and save log information for tracking and evidence purposes? Six log management points for maintaining compliance [shōseki shōko to shite rogu jōhō wo sh0sh0 hozon suru ni wa? Konpuraiansu no tame no rogu kanri muttsu no pointo], Network World, Japan; IDG Japan, Inc.; Oct. 1, 2006 vol. 11 No. 10, pp. 54-57.
Watanabe, Hidetoshi; Part 1, Log management for figuring out user behavior: the purpose of log management is to monitor work processes. [yūzā no kyodō wo haaku suru tame no rogu kanri: rogu kanri no mokuteki wa gyōmu purosesu no kanshi], Network World, Japan; IDG Japan, Inc.; Oct. 1, 2006 vol. 11 No. 10, pp. 48-53.
Sultan Izraehl Daniehl, English Abstract of Russian Publication No. RU2241252 published Nov. 27, 2004 (2 pages).
Gertner Dmitrij Aleksandrovich, English Abstract of Russian Publication No. RU2002116399 entitled Personal Cryptoprotection System published Feb. 10, 2004 (2 pages).

\* cited by examiner

| Schema | Key Field(s) | | Timestamp Field(s) | | | Value Field(s) | | | | |
|---|---|---|---|---|---|---|---|---|---|---|
| DHCP Schema | IP Address | Network Zone | Start Time | End Time | Creation Time | Host-name | MAC Address | | | |
| VPN Schema | IP Address | Network Zone | Start Time | End Time | Creation Time | Host-name | MAC Address | User | | |
| NAT Schema | IP Address | Network Zone | Start Time | End Time | Creation Time | Host-name | Actual IP Addr. | Source Port | | |
| Login Schema | IP Address | Network Zone | Start Time | End Time | Creation Time | Destin. User | Source User | Source Host. | Source IP Addr. | Source Zone |
| Asset Ownership/ Assignment Schema | MAC Address | | Start Time | End Time | Creation Time | Person | | | | |

Legend

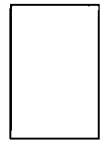 = Field

TRACKING CHANGING STATE DATA TO ASSIST IN COMPUTER NETWORK SECURITY

CROSS-REFERENCE TO RELATED APPLICATION

This application claims the benefit of U.S. Provisional Application No. 60/862,932, filed Oct. 25, 2006, which is hereby incorporated by reference herein in its entirety.

BACKGROUND

1. Field of the Invention

This invention pertains in general to security information/event management (SIM or SIEM) and in particular to tracking state data (e.g., about a network, a device, or another real-world phenomenon) so that the state data can be used in conjunction with security information/events.

2. Description of the Related Art

The field of security information/event management (SIM or SIEM) is generally concerned with 1) collecting data from networks and networked devices that reflects network activity and/or operation of the devices and 2) analyzing the data to enhance security. For example, the data can be analyzed to identify an attack on the network or a networked device and determine which user or machine is responsible. If the attack is ongoing, a countermeasure can be performed to thwart the attack or mitigate the damage caused by the attack. The data that is collected usually originates in a message (such as an event, alert, or alarm) or an entry in a log file, which is generated by a networked device. Exemplary networked devices include firewalls, intrusion detection systems, and servers. The message or entry usually includes a timestamp that reflects when the network activity occurred.

While it is possible to identify and investigate an attack using only the collected data, it is often helpful to have additional information such as the state of the network. A network's state includes, for example, the various devices in the network and how the devices are connected (e.g., the network's topology). Each device also has a state. This state includes various attributes such as, for example, a hardware attribute (e.g., a Media Access Control (MAC) address of the device), a logical attribute (e.g., an Internet Protocol (IP) address assigned to the device), an ownership attribute (e.g., a person or entity who owns the device), a geographical attribute (e.g., a physical location of the device), a software attribute (e.g., an operating system installed on the device), a login attribute (e.g., a user who is currently logged in to the device), a process attribute (e.g., a process that is currently executing on the device), and a network attribute (e.g., an active network connection of the device).

Consider a message that has been identified as being part of an attack. Information in the message might indicate the source device of the attack (e.g., by the device's IP address). This IP address can then be used to identify other messages that are part of the same attack. But it would also be helpful to know to which device the IP address is assigned (e.g., as indicated by the device's MAC address or hostname). If the device/IP address pair is known, then any mention of the IP address can be traced back to the device. Also, if the users logged in to that device are known, then the device can be traced back to the users. If the users' roles are known, then the users can be traced back to their roles, and the roles can be considered in conjunction with the messages that were received and the actions that the messages describe.

Unfortunately, it is not easy to determine the state of the network at any given time. This is because the state is not constant—it changes over time. In particular, each device's state changes over time. For example, the IP address assigned to a device can change over time due to different Dynamic Host Configuration Protocol (DHCP) leases, different Virtual Private Networks (VPNs) being used, or Network Address Translation (NAT). As another example, the users logged in to a device can change over time as various people log in and log out. Thus, it is helpful to know not only the current state of the network but also the past state(s) of the network. Since the attributes of a particular device can change, knowing the correct attributes at any given point in time is helpful in order to correlate events involving the same machine or user.

Consider a user on a first machine trying to log in to a second machine. If the user tries to log in ten times within five minutes and fails each time, then this occurrence should be flagged for review because it might signify an attack. Assume that each failed login generates a message that includes the IP address of the first machine. If the first machine had the same IP address for all ten failed logins, then an attack would be identified. On the other hand, if the first machine changed IP addresses during the attack, then some messages would indicate a first IP address and other messages would indicate a second IP address. Since neither IP address was used for all ten failed logins, nothing would be flagged for review. This is called a false negative.

In this situation, it would be helpful to know the state of the network at the time of the possible attack. For example, at the time of each failed login message, it would be helpful to know to which device (e.g., based on MAC address or hostname) the IP address was assigned. If this were known, then even though the failed logins came from different IP addresses, the IP addresses could be traced back to the same device and an attack could be identified. This is made possible by the fact that MAC addresses and hostnames change less frequently than IP addresses. In other words, IP addresses are more transient than MAC addresses and hostnames.

Note that changing IP addresses can also cause false alarms. Along the lines of the example above, consider four failed logins from one source device and six failed logins from another source device, each occurring within a five-minute time span and directed at the same machine. Although the source devices are different, and they never had the same IP address simultaneously, each device had the same IP address at the time that device caused a failed login. Since this same IP address was present in all ten failed login messages, this occurrence would be flagged for review. This is called a false positive.

What is needed is a way to maintain and query changing state data in an efficient manner so that the data can be used in real-time in conjunction with security information/events.

BRIEF SUMMARY OF THE INVENTION

A network's state changes over time. In particular, each device's state changes over time. If a state attribute (such as Internet Protocol (IP) address) changes over time, then a particular value of that attribute is valid for a particular time period, which we will refer to as a "session." In general, a session can be thought of as an association between two entities (e.g., a device and an IP address or a person and an asset) that is valid for a particular time period.

Session information can be used by itself or in conjunction with other information (e.g., other datastores or security information/events collected from networks and/or networked devices). Session information can be used for correlation, auditing, associating actions with users, associating users with business roles, identifying devices, enforcing company policies based on users and/or roles, filtering events, reporting, etc. For example, session information can be correlated with other information according to rules to identify and/or investigate attacks or anomalous behavior. Security information/events include timestamps that reflect when network activity occurred. When these events are correlated with session information, the session information reflects the session that was valid at the time of the timestamps.

For each type of session, a session table is maintained. A session table includes one or more records, where each record represents a session. Session record information is stored in various fields. Together, these fields comprise a schema for the session information. Each schema includes three types of fields: key fields, value fields, and timestamp fields. Session information is described as keys and values in order to support query/lookup operations.

A session table can be associated with a filter. The filter describes a set of conditions that defines the data that is managed by the session table (e.g., a set of keys that can be used for records in that table). Using a filter decreases the time necessary to evaluate an event against available session information because unnecessary lookups of session information are eliminated.

One way to populate a session table is to use data contained in security information/events. Rules are created to identify events related to session information, extract the session information, and use the session information to modify a session table (e.g., by creating, modifying, or terminating a session record). Relying on events to start and end sessions can result in an inaccurate session table. These problems can be addressed by using rules to implicitly determine session boundaries based on events that have been received.

There can be a delay between the time a session starts or ends and the time that this information is entered into a session table. Sometimes the delay is small. In this situation, it can be helpful to wait before attempting to correlate a security event with that session data. Sometimes the delay is large. In this situation, session information might arrive "late," in that correlation has already been attempted between session information of that time interval and various security events. In one embodiment, in this situation, correlation is performed again to take advantage of the session information that was received late.

A session table is partitioned so that the number of records in each session table partition is decreased. This decreases the amount of resources required to perform each query. A session table is processed periodically so that active sessions are moved to the current partition. This feature, which is called "session rollup," guarantees that if a session is active, its record will be located in the current partition. In other words, live session information is "rolled up" from a previous partition to the current partition so that the information is readily available in the current partition. Session rollup decreases the amount of resources required to access an active session because only the current partition need be queried.

BRIEF DESCRIPTION OF THE DRAWINGS

FIG. 1 shows exemplary schemas for different types of session information.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE EMBODIMENTS

Although the present system will be discussed with reference to various illustrated examples, these examples should not be read to limit the broader spirit and scope of the present invention. For example, the examples presented herein describe security information/events, session tables, and records, which are but one embodiment of the present invention. The general concepts and reach of the present invention are much broader and may extend to any computer-based or network-based security system. Also, examples of the messages that may be passed to and from the components of the system and the data schemas that may be used by components of the system are given in an attempt to further describe the present invention, but are not meant to be all-inclusive examples and should not be regarded as such.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Introduction to Sessions

As explained above, a network's state is not constant—it changes over time. In particular, each device's state changes over time. If a state attribute (such as Internet Protocol (IP) address) changes over time, then a particular value of that attribute is valid for a particular time period, which we will refer to as a "session." Information associated with a session ("session information") includes, for example, a first timestamp that indicates the start of the session, a second timestamp that indicates the end of the session (if the session has ended), a third timestamp that indicates the creation of a session record (discussed below), and one or more pieces of data that are valid during that session.

Consider a device that has received an IP address via a Dynamic Host Configuration Protocol (DHCP) lease. The one or more pieces of data might include a) an IP address (and, if the IP address is not globally unique, a network zone that contains the IP address) and b) an indication of the device to which the IP address was assigned (e.g., the device's hostname and/or Media Access Control (MAC) address). (A network zone is a network segment. A label identifies a network zone and is used to distinguish private address spaces from one another.) Similarly, consider a device that has received an IP address via a Virtual Private Network (VPN) login. In addition to (a) and (b) above, the one or more pieces of data might include a username that was used to initiate the VPN login. As another example, consider a device that has been characterized by an IP address via Network Address Translation (NAT). Here, the one or more pieces of data might include a) an IP address (and, if the IP address is not globally unique, a network zone that contains the IP address), b) an indication of the device to which the IP address was assigned via translation (e.g., the device's hostname and/or actual IP address and source port).

Other device state attributes can also be modeled using sessions. Consider a first device ("destination device") that allows other users to log in to it from a second device ("source device"). The one or more pieces of data might include a) an IP address (and, possibly, network zone) of the destination device, b) an indication of the source device (e.g., the source device's hostname and/or IP address and network zone), and c) other login information (e.g., the username used at the source machine and/or the username used at the destination machine).

While the session information described above is related to networking, many different types of information are valid for a particular time period and thus can be modeled using sessions. For example, information about the physical world can be modeled using sessions. An asset (such as a computer) can be owned by or assigned to a person or entity. A person can be present in a physical location. A phone number can be assigned to a person. Each of these states is temporary and, thus, can be modeled using a session.

In general, a session can be thought of as an association between two entities (e.g., a device and an IP address or a person and an asset) that is valid for a particular time period. Session information can be used by itself or in conjunction with other information (e.g., other datastores or security information/events collected from networks and/or networked devices). Session information can be used for correlation, auditing, associating actions with users, associating users with business roles, identifying devices, enforcing company policies based on users and/or roles, filtering events, reporting, etc. For example, if employees are required to swipe their ID cards when they enter and leave the office, then the following reports can be generated: average number of hours spent by employees at work and time pattern of employees entering and leaving the office.

As another example, session information can be correlated with other information according to rules to identify and/or investigate attacks or anomalous behavior. Recall that security information/events include timestamps that reflect when network activity occurred. When these events are correlated with session information, the session information reflects the session that was valid at the time of the timestamps. Exemplary correlations include:

a) Identifying events associated with a particular person—A device/person session table determines which device is owned by or assigned to the person. A login session table determines which devices have been logged in to by the person's device and which devices have been logged in to from those devices, etc. Events originating from those devices are identified.

b) Identifying a login that was initiated from a location other than the user's location—A login session table determines which usernames and source devices have logged in to a target device. A datastore determines which real people correspond to the usernames and where the source devices are located. A location/person session table determines where the real people are located (e.g., based on recent swipes of a badge or ID card to access a room or building). The real people's locations are compared to the source devices' locations.

c) Determining a moving average of attacks generated from machines accessing the network via VPN—IP addresses contained in messages related to attacks are compared to IP addresses in a VPN session table.

d) Determining a moving average of attacks generated from users accessing the network via VPN—IP addresses contained in messages related to attacks are compared to IP addresses in a VPN session table. Matching usernames in the records are determined.

e) Identifying users logged into a machine at the time the machine initiated an attack—A message related to an attack includes an indication of the device that initiated the attack and a timestamp indicating the initiation of the attack. A login session table determines which usernames were logged in to that device at that time.

In one embodiment, a rule comprises a set of simple or complex conditions optionally combined with other constructs such as aggregation, groupings, and triggers. A rule can be used in many ways, such as: to evaluate incoming events for specific conditions and patterns; to correlate information from different events using rule correlation as well as other constructs like active lists, session lists, and threat level calculations; to infer meaning about significance of events; and to initiate real-time actions in response to events.

Correlations and rules are further described in U.S. application Ser. No. 10/308,415, filed Dec. 2, 2002, which is hereby incorporated by reference herein in its entirety.

Framework for Storing Session Data

For each type of session, a session table is maintained. For example, one session table maintains session information related to devices and IP addresses while another session table contains session information related to people and assets. A session table includes one or more records, where each record represents a session. For example, a device/IP address session would describe a time period for which a particular device was assigned a particular IP address. This record would be stored in a device/IP address session table. In one embodiment, a session table is similar to a Session List, which is a feature of the ArcSigh™ Enterprise Security Manager (ESM) 4.0 (available from ArcSight, Inc. of Cupertino, Calif.).

Recall that session information includes, for example, a first timestamp that indicates the start of the session, a second timestamp that indicates the end of the session (if the session has ended), a third timestamp that indicates the creation of a session record, and one or more pieces of data that are valid during that session. This information is stored in a session record. The third timestamp indicates when the session record was created. Note that network latency might cause a gap in time between the start of a session and the creation of the record corresponding to that session.

Session record information is stored in various fields. Together, these fields comprise a schema for the session information. Different types of session information can have different schemas. FIG. 1 shows exemplary schemas for different types of session information. The illustrated schemas are DHCP, VPN, NAT, Login, and Asset Ownership. In FIG. 1, each rectangle represents a field.

Each schema includes three types of fields: key fields, value fields, and timestamp fields. In one embodiment, session information is described as keys and values in order to support query/lookup operations. (Query operations are used to access information in the session table and are further discussed below.) In this embodiment, each session table would specify one or more fields of a record to be used as keys (the "key field(s)"). One or more other fields of a record would be used as values ("value field(s)"). For example, in a device/IP address session table, the IP address (and, possibly, network zone) can be used as a key, and other session information (e.g., hostname and MAC address) can be used as the values.

Timestamp fields, which include the Start Time field, End Time field, and Creation Time field, each contain a timestamp as described above (unless the session has not ended, in which case the End Time field would be empty). The Start Time field value and End Time field value are used to identify a valid session for a given key at any given instance of time. For example, given a key and a particular timestamp, if that key maps to several sets of value fields, the appropriate set of value fields is the one whose Start Time and End Time surround the timestamp.

FIG. 1 shows the key field(s), timestamp field(s), and value field(s) for each schema. The indication of one or more key fields is also part of the session information schema.

In this way, the session table acts as a key-value mapping that maps or binds keys to values. For example, a session query would contain one or more keys ("query keys"), and the query result would contain one or more values that were bound to the one or more keys. Since a session can be thought of as an association between two entities, one entity is represented by the key, and the other entity is represented by the value.

The information contained in some fields can be identical among different sessions (and, therefore, among different records). For example, if a device is assigned a first IP address one day and a second IP address another day, each session record will contain identical information regarding the device (e.g., the device's MAC address or hostname). Similarly, if an IP address is assigned to a first device one day and a second device another day, each session record will contain identical information regarding the IP address.

If two records contain identical field information and this field information determines the key, then that one key needs to map to two different sets of information (one set for each session). This functionality can be implemented by, for example, putting the sets of session information in a list and having the key's value be that list. The Start Time field value and End Time field value are used to identify which set of session information is valid at a given instance of time, as described above. In one embodiment, the sets of session information are sorted within the list according to each session's start time. This decreases the time necessary to perform a lookup.

In one embodiment, a session table is implemented as a hashmap, and the key that is used for a lookup is a hashcode that is determined based on the hashcodes of all of the key fields. In this embodiment, the hashmap key can be thought of as a tuple of key field values.

The hashmap value is a data structure ("SessionIntervalDataStructure") that represents a list of one or more sets of session information. This is similar to the chained hash table technique. In one embodiment, the entries in the data structure (each of which is a set of session information) are managed using an interval tree. An interval tree is an ordered tree data structure used to hold intervals. An interval tree enables efficient determination of all intervals that overlap with a given interval or point.

Here, the interval of an entry uses that session's start time and end time as endpoints. In order to correlate a security event with information in a session table, the relevant session must first be identified. In one embodiment, the event's end time is used to match the interval to select an appropriate entry (session) applicable to the security event. If an entry is open-ended (i.e., the session has not yet terminated), a maximum time is used as an interval end time. The data structure used to represent the interval tree can vary. In one embodiment, if the number of expected entries per table and key tuple is limited, an array-based implementation is used.

The memory required to store a session table is proportional to the number of records in the table. In other words, the memory requirement grows in O(n) where n is the number of records loaded in memory for the session table. Regarding lookup time, if m is the number of unique keys (based on the key field tuple) in the session table and p is the average number of entries per unique key, then the time required to perform a lookup is O(log p). Here, m*p=O(n).

Common operations that are performed on a session table and their time order complexity are as follows: Querying a session value field (e.g., to correlate with a given event) is O(log p). Updating the end time of a record is O(log p). Inserting a new record is O(log p). These low time order complexities enable session tables to be queried and maintained in real-time so that the session information is available in real-time to be used for correlation, etc.

In order to retrieve session information that is applicable to a particular security event, a dependent variable function is defined. In one embodiment, this definition includes a name for the dependent variable, a session table to be used to retrieve the session information, and a mapping of the event's fields to the key fields in the session table. Based on this definition, corresponding entries are identified in the session table and made available to be used in correlation.

Dependent variables can be chained in order to access session information from different sources. A user can specify not only multiple data sources in which to look for information but also the order in which these data sources should be used. For example, a user can specify that if DHCP information and VPN information are both available, the MAC address can be retrieved from either and then combined with information from disparate sources to be used in correlation.

In one embodiment, a session table can be associated with a filter. The filter describes a set of conditions that defines the data that is managed by the session table (e.g., a set of keys that can be used for records in that table). For example, if the table stores DHCP information and the keys are IP addresses, then the filter can describe a range of IP addresses (e.g., the IP addresses that can be assigned by the DHCP server). Using a filter decreases the time necessary to evaluate an event against available session information because unnecessary lookups of session information are eliminated. A filter avoids querying a session table for an event for which session information is not available. In this way, a filter acts as a gate-keeper for queries directed to a table.

In one embodiment, a filter is implemented as follows: An event is identified for which a session table lookup is desired. Based on data stored within the event, the query key is determined. Before the lookup is performed, the query key is tested against that table's filter. If the key passes the test, then the desired data might be stored in the table and the lookup is performed. If the key fails the test (e.g., if the IP address key is not within the filter's range of IP addresses), then the desired data is not stored in the table and the lookup is not performed.

A session table can be populated with data in various ways. One way is to import data from a file such as an archives The file, which can be located on any networked device, can contain any type of information in any format (e.g., comma-separated values (CSV) format). For example, the file may have been output by a datastore that contains information that is desired to be correlated with security information/events. Consider a database that contains Human Resources (HR) information such as employees and their business roles within an organization. Exporting this HR data from the database to a file and then importing the file into a session table will make the data available in real-time for correlation, etc. This data can be used, for example, to enforce network access policies based on a user's business role rather than based on a device or an IP address.

Another way to populate a session table is to use directory services to retrieve data from datastores. These directory services can be accessed via various protocols such as Lightweight Directory Access Protocol (LDAP) or X.500.

Yet another way is to use one or more software agents (such as SmartConnectors from ArcSight, Inc.) to send the desired data in the form of events. Then, one or more rules can be used to process the events. Specifically, the rules can extract session data from the events and use this data to populate session tables.

Another way is to enter the session data directly into the data structure underlying the session list. For example, if the session list is stored in a database (see below), then the session data can be entered directly into the database.

Yet another way to populate a session table is to use data contained in security information/events. Rules are created to identify events related to session information, extract the session information, and use the session information to modify a session table (e.g., by creating, modifying, or terminating a session record). The rules can be run on events as the events occur ("live mode") or on past events that have been stored ("batch mode").

One example of populating a session table based on events is DHCP snooping, where DHCP information (e.g., lease assignment events) is used to create a DHCP session table. For example, a DHCP acknowledgment message causes a rule to create and start a session (i.e., add a record to the DHCP session table). A DHCP release message causes a rule to terminate a session (i.e., add an end time to an existing record in the DHCP session table).

Relying on events to start and end sessions can result in an inaccurate session table. For example, network latency can cause events to arrive late and/or out-of-order. Also, some events might never arrive, such as DHCP release messages, which are optional. These problems can be addressed by using rules to implicitly determine session boundaries based on events that have been received. In one embodiment, session boundaries are implicitly determined for session information that is non-overlapping.

Session information can be either overlapping or non-overlapping, based on the type of the information involved. If session information is non-overlapping, this means that at any instance of time, for a given key, only one valid session exists (and, thus, only one valid session record exists). DHCP information is one example of non-overlapping session information. This is because for a given network zone, an IP address (key) can be assigned by a DHCP server to only one device (value) at any given instance of time. This assignment can change later to another device, but by that time the earlier device would have released the same IP address. VPN information is another example of non-overlapping session information. On a given network zone, VPN software assigns an IP address to only one user/machine at any given instance of time, based on its configuration.

If session information is overlapping, this means that at any instance of time, for a given key, multiple valid sessions can exist (and, thus, multiple valid session records can exist). Login information is one example of overlapping session information. This is because for a given network zone, an IP address (key) can be logged in to by multiple users (value) at any given instance of time.

The overlapping/non-overlapping nature of session information affects what types of values are returned when a session table is queried. For example, if a session table contains non-overlapping information, then a successful lookup based on a key/timestamp pair will return only one set of session information. On the other hand, if a session table contains overlapping information, then a successful lookup based on a key/timestamp pair might return multiple sets of session information (e.g., a list whose entries are sets of session information, as described above).

Implicit determination of session boundaries comes in two forms: implicit session termination and implicit session splitting. Implicit session termination comprises determining that an existing session has ended without having actually received a session termination event. When a session start event arrives that contains a key for an existing active session, the previous session for that key is terminated and a new session is created and started using the information contained in the session start event. (An active session, also referred to as a "live" or "ongoing" session, is a session whose record does not contain an end time timestamp.) Arriving session start events of this type commonly occur with DHCP session information because DHCP servers usually don't log lease expiration events.

In one embodiment, implicit session termination proceeds as follows: When a session start event arrives, its key fields are determined and used to generate a hashcode. The relevant session table is checked for a pre-existing active session corresponding to that hashcode. If a pre-existing active session is found, then this session must have terminated, since the session information cannot overlap. The pre-existing session is terminated by putting a timestamp in the end time field of the session record. A new session is created (corresponding to the same hashcode) and started using the information in the session start event.

Example of implicit session termination—According to a record in a session table, an IP address in a given network zone (key) is assigned to a particular hostname and MAC address (192.168.0.1, Internal Zone 1)=>(hostname1, 11:11:11:11:11:11) at Oct. 12, 2007 10 PM. At Oct. 12, 2007 11 PM, a session start event arrives that maps the same IP address in the same zone (key) to a different device (192.168.0.1, Internal Zone 1)=>(hostname2, 22:22:22:22:22:22). The session start event will cause the first session to be terminated (with an end time of Oct. 12, 2007 11 PM) and a second session to be created and started (with a start time of Oct. 12, 2007 11 PM).

Implicit session splitting comes in two forms. In the first form, a session termination event arrives for a session that has already terminated. If the session termination time in the newly-arrived event is earlier than the end time currently stored in the corresponding session record, the new session termination time is stored in the session record. This scenario can occur if, for example, the previous session termination time was derived using implicit session termination.

Example of implicit session splitting (first form)–According to a record in a session table, a session terminated Oct. 12, 2007 11 PM. A session termination event arrives that corresponds to this session record and indicates a termination time of Oct. 12, 2007 10:30 PM. The end time in the session record is changed from Oct. 12, 2007 11 PM to Oct. 12, 2007 10:30 PM.

In the second form of implicit session splitting, a session start event or session end event arrives whose timestamp corresponds to an existing session. The existing session can be an ongoing session or a terminated session. If the value stored in the existing session differs from the value stored in the event, then the existing session is split, and a new session is created and started in the middle.

Example of implicit session splitting (second form)–According to a session table, a session S1 starts at Jan. 1, 2008 1 PM and ends at Jan. 1, 2008 10 PM, and a session S2 starts at Jan. 1, 2008 11 PM and is active. An event arrives that indicates the existence of a session S3 starting at Jan. 1, 2008 6 PM. Session S1 is split so that it starts at Jan. 1, 2008 1 PM and ends at Jan. 1, 2008 6 PM. Session S3 is created so that it starts at Jan. 1, 2008 6 PM and ends at Jan. 1, 2008 11 PM. Session S2 remains as an active session that starts at Jan. 1, 2008 11 PM.

There can be a delay between the time a session starts or ends and the time that this information is entered into a session table. Sometimes the delay is small. For example, if a session start event is generated by a device in Japan, it can take a second or more for that event to be collected and processed in the United States. In this situation, it can be helpful to wait before attempting to correlate a security event with that session data. If the correlation is attempted too soon, the session data might be stale or might not even exist. Waiting to correlate a security event is referred to as "parking" the security event. In one embodiment, if session data exists, a security event is parked for a minimum wait time. The hope is that the session data will be updated (if necessary) during that wait time and then be available for correlation. In one embodiment, if session data does not exist, a security event is parked for a maximum wait time. The hope is that the session data will be loaded during that wait time and then be available for correlation.

Sometimes the delay is large. For example, session information from an employee badging system might be imported nightly (e.g., in a batch process) rather than loaded in real-time (e.g., as badge swipes occur). In these situations, session information might arrive "late," in that correlation has already been attempted between session information of that time interval and various security events. In one embodiment, in this situation, correlation is performed again to take advantage of the session information that was received late. For example, a correlation rule can be re-run on a window of past security events (e.g., the security events that were received in the past two hours). The circumstances under which a correlation rule should be re-run (and which events it should be re-run on) are configurable.

Implementation Details

As discussed above, session data is stored in session tables. Specifically, each type of session data is stored in a separate session table (e.g., one session table for DHCP session data and one session table for login session data). In order for session data to be referred to later, the session tables are stored in persistent, non-volatile storage such as a hard drive. In one embodiment, the session tables are stored in a database such as a relational database.

The number of records in a session table can increase significantly over time, leading to very large session tables. Performing a query on a large table is much more expensive (in terms of computer resources such as processor time) than performing a query on a small table. In one embodiment, a session table is partitioned so that the number of records in each session table partition is decreased. This decreases the amount of resources required to perform each query.

In one embodiment, the session table is partitioned based on session start time. Recall that each record in a session table includes a start time timestamp. The value of this timestamp determines in which partition the record is stored. In one embodiment, each partition represents a 24-hour period. For example, a first partition represents Jan. 1, 2007 12:00 AM to Jan. 1, 2007 11:59 PM and a second partition represents Jan. 2, 2007 12:00 AM to Jan. 2, 2007 11:59 PM. In this embodiment, one year's worth of session data would be stored in 365 partitions rather than in one huge session table.

Correlation can be done in either batch mode or in real-time. In batch mode, when security information/events are received, they are stored. Later, the stored security information/events are correlated with the session information—specifically, the session information that was valid at the timestamps of the events.

In real-time mode, when security information/events are received, they are correlated with the session information in real-time or near real-time. In order for this correlation to take place in real-time, the session data must be maintained in real-time and must also support real-time querying. This is very difficult to achieve, since thousands of events are generated per minute, and each event can include one or more references to session information (e.g., one or more IP addresses to be used to determine the MAC addresses to which those IP addresses have been assigned or one or more hostnames to be used to determine the users who are logged in to that host). For example, an event rate of 5,000 events/second and 2 session references/event results in 10,000 session references/second.

In one embodiment, a portion of a session table is also maintained in volatile memory (e.g., a cache or Random Access Memory (RAM)) in order to support faster access for updating and/or querying. For example, if the session table is partitioned in long-term storage, then the current partition (or a portion thereof) is also stored in volatile memory. In general, the portion of the session table in volatile memory will include sessions that are active and, possibly, sessions that were recently terminated (e.g., within the past ten minutes). Since most real-time updates and queries will concern active sessions and recently-terminated sessions, storing these sessions in volatile memory will decrease the amount of resources required to perform each update and query. In one embodiment, the portion of the session table that is maintained in volatile memory is initially loaded from long-term storage. The number of records to be stored in volatile memory is configurable.

In order to maintain the consistency of the session table in long-term storage, updates are collected and periodically applied to the session table as a batch operation. For example, updates are collected over a one-minute period and then applied to the session table in long-term storage as a batch operation.

Even if a session table has been partitioned, it can still be expensive to locate a particular session. For example, if a session's start time is not known, then each partition must be searched until the session is found. In one embodiment, a session table is processed periodically so that active sessions are moved to the current partition. This feature, which is called "session rollup," guarantees that if a session is active, its record will be located in the current partition. In other words, live session information is "rolled up" from a previous partition to the current partition so that the information is readily available in the current partition (which is stored in volatile memory, as described above). Session rollup decreases the amount of resources required to access an active session because only the current partition need be queried.

After session rollup, past partitions will contain only terminated sessions (i.e., sessions whose records contain end time timestamps). Since past partitions do not contain live session data, it is easier to delete or archive these partitions.

In one embodiment, session rollup is implemented via a scheduled task. The task is scheduled to run periodically (e.g., at each partition boundary if the partition is based on time). The specific period is configurable. If a session extends from one partition to another (e.g., because the partitions are based on date, and because the session is live on two different dates), the session is split into multiple sessions based on partition boundaries, and each session is stored in a different partition.

For example, consider a first partition that represents Jan. 1, 2007 12:00 AM to Jan. 1, 2007 11:59 PM and a second partition that represents Jan. 2, 2007 12:00 AM to Jan. 2, 2007 11:59 PM. A session starts Jan. 1, 2007 11:00 PM and ends Jan. 2, 2007 1 AM. Session rollup will divide the session into two sessions: a) Jan. 1, 2007 11:00 PM to Jan. 1, 2007 11:59 PM and b) Jan. 2, 2007 12:00 AM to Jan. 2, 2007 1 AM. Session (a) will be stored in the first partition as a terminated session, and session (b) will be stored in the second partition (also as a terminated session). If the session concerns DHCP information, a given IP address and network zone will match to the same hostname and MAC address for all the events that have timestamps between Jan. 1, 2007 11:00 PM and Jan. 2, 2007 1 AM, regardless of the session splitting.

As another example, consider a session that starts Oct. 1, 2007 2 PM and is ongoing as of Oct. 5, 2007. Performing session rollup on Oct. 5, 2007 will split the session into five sessions (one for October 1, one for October 2, one for October 3, one for October 4, and one for October 5). The first four sessions stored in their respective partitions as terminated, and the fifth session (October 5) will be stored in the active partition as ongoing.

In one embodiment, session rollup includes: Of the sessions that started since the last session rollup (or the sessions that started during the previous partition, whichever is earlier), determining which sessions are active. For each of these sessions, splitting the session into multiple sessions based on the partition boundary. For a terminated portion of a session, adding that portion to a past partition so that it ends at the partition boundary time. For an ongoing portion of a session, adding that portion to the current partition so that it begins at the partition boundary time.

In order to determine the length of an entire session, the split sessions can be combined. Specifically, if a session ends at a partition boundary time and the next partition includes a session with the same key and values that starts at the partition boundary time, then these sessions correspond to one another. The durations of these sessions can be combined to determine the duration of the entire (non-split) session.

In one embodiment, when a session is split into multiple session portions, each session portion is annotated in some way to indicate that it is part of a larger session. This helps identify session portions when determining the duration of an entire (non-split) session. For example, a flag is added to the record for each session portion. As another example, the start time of the overall (non-split) session is added to the record for each session portion. In this example, corresponding session portions would have identical start times for the overall session in addition to identical keys and values.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for recording information in a session table, the method comprising:

identifying, by a physical processor implementing machine readable instructions, an event, wherein the event comprises a timestamp and information about operation of a networked device;

partitioning, by the physical processor implementing the machine readable instructions, the session table into a plurality of partitions, wherein the plurality of partitions includes an active session partition;

moving, by the physical processor implementing the machine readable instructions, active sessions in the session table from at least one other partition to the active session partition;

determining, by the physical processor implementing the machine readable instructions, a query key based on information of the event, wherein the query key comprises a value of a field in a session in the session table;

generating, by the physical processor implementing the machine readable instructions, a hash code based on the query key;

querying, by the physical processor implementing the machine readable instructions, the session table in at least the active session partition using the hash code to determine whether an active session in the session table corresponds to the hash code; and in response to a determination that an active session in the session table corresponds to the hash code, terminating, by the physical processor implementing the machine readable instructions, the active session and creating a new session in the session table in the active session partition to record the information of the event.

2. The method of claim 1, wherein terminating the active session comprises inserting, by the physical processor implementing the machine readable instructions, a timestamp in an end-time field of the active session.

3. The method of claim 1, wherein the query key comprises an Internet Protocol (IP) address.

4. The method of claim 1, comprising:
creating, by the physical processor implementing the machine readable instructions, a new session in the session table for a new event associated with a device connected to a network, wherein the created session includes a hostname or a Media Access Control (MAC) address of the device.

5. The method of claim 4, wherein creating the new session comprises:
determining, by the physical processor implementing the machine readable instructions, a start time of the session based on information associated with the new event; and
inserting, by the physical processor implementing the machine readable instructions, the start time in a first timestamp field for the new session.

6. The method of claim 5, further comprising:
determining, by the physical processor implementing the machine readable instructions, an end time of the new session; and
inserting, by the physical processor implementing the machine readable instructions, the end time in a second timestamp field for the new session.

7. The method of claim 6, wherein determining an end time of the new session comprises:
receiving, by the physical processor implementing the machine readable instructions, a session termination event; and
determining, by the physical processor implementing the machine readable instructions, the end time from the session termination event.

8. The method of claim 1, wherein querying the session table comprises determining, by the physical processor implementing the machine readable instructions, a session in the session table having a start time earlier than the timestamp of the event and an end time later than the timestamp of the event.

9. The method of claim 1, wherein querying the session table comprises, by the physical processor implementing the machine readable instructions, testing the hash code against a filter associated with the session table.

10. The method of claim 1, wherein querying the session table in the active session partition comprises:
determining, by the physical processor implementing the machine readable instructions, whether the event is associated with a batch process;
in response to determining the event is associated with the batch process, querying, by the physical processor implementing the machine readable instructions, the session table in the active session partition after the batch process.

11. The method of claim 10, wherein querying the session table comprises querying, by the physical processor implementing the machine readable instructions, the session table in the active session partition before and after the batch process.

12. The method of claim 1, wherein querying the session table in the active session partition comprises:
determining, by the physical processor implementing the machine readable instructions, whether an active session in the session table exists in the session table based on the hash code and a timestamp field of each session in the session table that indicates whether the session is terminated.

13. The method of claim 1, wherein partitioning the session table into a plurality of partitions includes partitioning the session table by session start time, and wherein querying the session table comprises:
determining, by the physical processor implementing the machine readable instructions, the active session partition of the session table based on the timestamp of the event; and
querying, by the physical processor implementing the machine readable instructions, the active session partition using the hash code.

14. A non-transitory computer readable storage device storing machine readable instructions which, when executed by a physical processor, cause the physical processor to:
record information in a session table, the session table comprising one or more sessions, each comprising one or more key fields and one or more timestamp fields and a value field;
partition the session table into a plurality of partitions, wherein the plurality of partitions includes an active session partition;
move active sessions in the session table from at least one other partition to the active session partition;
identify an event, wherein the event comprises a timestamp and information about operation of a networked device;
determine a query key based on information of the event, the query key comprising a value of the value field;
generate a hash code based on the query key;
query the session table in the active session partition using the hash code to determine whether an active session in the session table in the active session partition corresponds to the hash code; and
in response to a determination that an active session in the session table in the active session partition corresponds to the hash code, terminate the active session and create a new session in the session table in the active session partition to record the information of the event.

15. An apparatus for recording information in a session table, the apparatus comprising:
a physical processor; and
a non-transitory memory storing machine readable instructions that when executed by the physical processor cause the physical processor to:
identify an event, wherein the event comprises a timestamp and information about operation of a networked device;
partition the session table into a plurality of partitions, wherein the plurality of partitions includes an active session partition;
move active sessions in the session table from at least one other partition to the active session partition;
determine a query key based on information of the event, wherein the query key comprises a value of a field in a session in the session table in the active session partition;

generate a hash code based on the query key;
query the session table in the active session partition using the hash code to determine whether an active session in the session table in the active session partition corresponds to the hash code; and
in response to a determination that an active session in the session table in the active session partition corresponds to the hash code, terminate the active session and create a new session in the session table in the active session partition to record the information of the event.

* * * * *